United States Patent
Fujii

(10) Patent No.: US 12,397,467 B2
(45) Date of Patent: Aug. 26, 2025

(54) ELECTRIC WORK MACHINE

(71) Applicant: MAKITA CORPORATION, Anjo (JP)

(72) Inventor: Fuminari Fujii, Anjo (JP)

(73) Assignee: MAKITA CORPORATION, Anjo (JP)

( * ) Notice: Subject to any disclaimer, the term of this patent is extended or adjusted under 35 U.S.C. 154(b) by 426 days.

(21) Appl. No.: 17/983,890

(22) Filed: Nov. 9, 2022

(65) Prior Publication Data

US 2023/0191645 A1 Jun. 22, 2023

(30) Foreign Application Priority Data

Dec. 21, 2021 (JP) ................................. 2021-207415

(51) Int. Cl.
| | | |
|---|---|---|
| *B27B 17/08* | (2006.01) | |
| *H02K 5/08* | (2006.01) | |
| *H02K 5/18* | (2006.01) | |
| *H02K 9/06* | (2006.01) | |
| *B27B 17/02* | (2006.01) | |

(52) U.S. Cl.
CPC ............... *B27B 17/08* (2013.01); *H02K 5/08* (2013.01); *H02K 5/18* (2013.01); *H02K 9/06* (2013.01); *B27B 17/02* (2013.01)

(58) Field of Classification Search
CPC ........ H02K 11/215; H02K 21/16; H02K 5/08; H02K 5/18; H02K 7/145; H02K 9/06; B27B 17/02; B27B 17/08; B25F 5/00; B25F 5/008

See application file for complete search history.

(56) References Cited

U.S. PATENT DOCUMENTS

| | | | | |
|---|---|---|---|---|
| 7,330,006 | B2 * | 2/2008 | Iwata ..................... | B25F 5/008 318/400.41 |
| 8,405,260 | B2 * | 3/2013 | Takeyama ............... | B25F 5/008 310/71 |
| 9,787,159 | B2 * | 10/2017 | Beyerl ................... | H02K 3/522 |
| 2019/0001452 | A1 * | 1/2019 | Nagahama ............. | H02K 3/522 |
| 2019/0273421 | A1 | 9/2019 | Velderman et al. | |
| 2020/0052559 | A1 | 2/2020 | Matsushita et al. | |
| 2021/0099052 | A1 | 4/2021 | Suzuki et al. | |

FOREIGN PATENT DOCUMENTS

| | | | | |
|---|---|---|---|---|
| JP | 2008-104254 | A | 5/2008 | |
| JP | 2019-017129 | A | 1/2019 | |
| KR | 102359705 | B1 * | 2/2022 | |
| WO | WO-2004064227 | A1 * | 7/2004 | .............. H02K 7/14 |
| WO | 2018/180085 | A1 | 10/2018 | |
| WO | 2018/198671 | | 11/2018 | |

OTHER PUBLICATIONS

Jun. 24, 2025 Office Action issued in Japanese Application No. 2021-207415.

* cited by examiner

Primary Examiner — Naishadh N Desai
(74) Attorney, Agent, or Firm — Oliff PLC

(57) ABSTRACT

An electric work machine is driven appropriately. An electric work machine includes a motor including a stator, a rotor rotatable relative to the stator, and a rotor shaft fixed to the rotor, an output unit drivable by the rotor shaft, a motor case accommodating the stator and the rotor, a magnet located inside the motor case and rotatable by the rotor, and a magnetic sensor located inside the motor case to detect the magnet.

20 Claims, 14 Drawing Sheets

ELECTRIC WORK MACHINE

CROSS-REFERENCE TO RELATED APPLICATIONS

This application claims the benefit of priority to Japanese Patent Application No. 2021-207415, filed on Dec. 21, 2021, the entire contents of which are hereby incorporated by reference.

BACKGROUND

1. Technical Field

The present disclosure relates to an electric work machine.

2. Description of the Background

In the field of electric work machines, a known power tool includes a motor and a sensor board, as described in Japanese Unexamined Patent Application Publication No. 2019-017129.

BRIEF SUMMARY

A motor includes a stator and a rotor rotatable relative to the stator. The rotation of the rotor is detected by magnetic sensors supported on a sensor board. The motor is controlled based on detection signals obtained by the magnetic sensors. The electric work machine may not be driven appropriately when the detection accuracy of the magnetic sensors is reduced.

One or more aspects of the present disclosure are directed to an electric work machine that is driven appropriately.

A first aspect of the present disclosure provides an electric work machine, including:
a motor including
 a stator,
 a rotor rotatable relative to the stator, and
 a rotor shaft fixed to the rotor;
an output unit drivable by the rotor shaft;
a motor case accommodating the stator and the rotor;
a magnet located inside the motor case and rotatable by the rotor; and
a magnetic sensor located inside the motor case to detect the magnet.

The electric work machine according to the above aspect of the present disclosure is driven appropriately.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of an electric work machine 1.

The electric work machine 1 includes a motor 12. A direction parallel to a rotation axis AX of the motor 12 is referred to as an axial direction for convenience. A direction radial from the rotation axis AX of the motor 12 is referred to as a radial direction or radially for convenience. A direction about the rotation axis AX of the motor 12 is referred to as a circumferential direction, circumferentially, or a rotation direction for convenience.

A position nearer the center of the motor 12 in the axial direction, or an axial direction toward the center of the motor 12, is referred to as axially inward for convenience. A position farther from the center of the motor 12 in the axial direction, or an axial direction away from the center of the motor 12, is referred to as axially outward for convenience. A position nearer the rotation axis AX of the motor 12 in the radial direction, or a radial direction toward the rotation axis AX, is referred to as radially inward for convenience. A position farther from the rotation axis AX of the motor 12 in the radial direction, or a radial direction away from the rotation axis AX, is referred to as radially outside or radially outward for convenience. A position in one circumferential direction, or one circumferential direction, is referred to as a first circumferential direction for convenience. A position in the other circumferential direction, or the other circumferential direction, is referred to as a second circumferential direction for convenience.

First Embodiment

A first embodiment will now be described.
Electric Work Machine

Figure 1:
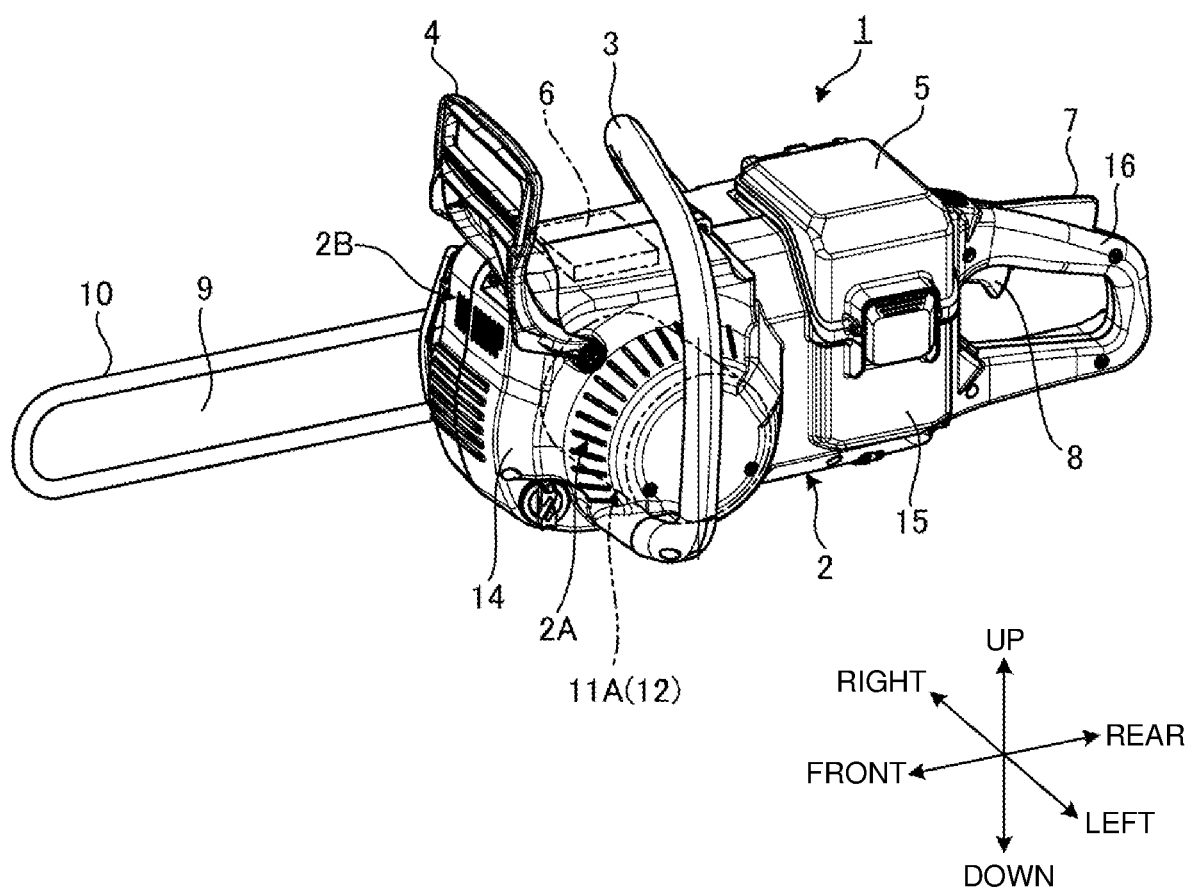
FIG. 1 is a left perspective view of an electric work machine according to a first embodiment.

FIG. 1 is a left perspective view of the electric work machine 1 according to the present embodiment. The electric work machine 1 according to the present embodiment is a chain saw as an example of outdoor power equipment.

The electric work machine 1 includes a housing 2, a front grip 3, a hand guard 4, a battery cover 5, a controller 6, a trigger lock lever 7, a trigger switch 8, a guide bar 9, a saw chain 10, and a motor assembly 11A.

The housing 2 is formed from a synthetic resin. The housing 2 includes a motor compartment 14, a battery holder 15, and a rear grip 16.

The motor compartment 14 accommodates the motor assembly 11A. The motor assembly 11A includes the motor 12.

The battery holder 15 holds a battery pack (not shown). The battery holder 15 includes a battery mount to which the battery pack is attached. The battery holder 15 holds the battery pack with the battery mount in between. The battery holder 15 is connected to the rear end of the motor compartment 14. The battery cover 5 covers the battery pack held in the battery holder 15.

The battery pack is detachable from the battery holder 15. The battery pack includes a secondary battery. The battery pack in the present embodiment includes a rechargeable lithium-ion battery. The battery pack functions as a power supply for the electric work machine 1. The battery pack is held in the battery holder 15 to power the electric work machine 1.

The rear grip 16 is grippable by a hand of a user of the electric work machine 1. The rear grip 16 is connected to the rear end of the battery holder 15. A portion of the rear grip 16 is connected to an upper portion of the rear end of the battery holder 15. A portion of the rear grip 16 is connected to a lower portion of the rear end of the battery holder 15.

The motor compartment 14 has an inlet port 2A in its left portion. The motor compartment 14 has an outlet port 2B in its front portion. Air outside the housing 2 flows into the housing 2 through the inlet port 2A. Air inside the housing 2 flows out of the housing 2 through the outlet port 2B.

The front grip 3 is grippable by a hand of the user of the electric work machine 1. The front grip 3 is formed from a synthetic resin. The front grip 3 is a pipe. The front grip 3 is connected to the housing 2. The front grip 3 has its left end connected to the left side surface of the motor compartment 14. The front grip 3 has its right end connected to the right side surface of the battery holder 15.

The hand guard 4 protects the hand of the user holding the front grip 3. The hand guard 4 is located in front of the front grip 3. The hand guard 4 is connected to an upper portion of the motor compartment 14.

The controller 6 outputs control signals for controlling the electric work machine 1. The controller 6 controls a drive current supplied from the battery pack to the motor 12. The controller 6 is accommodated in the motor compartment 14.

The trigger lock lever 7 is operable by the user of the electric work machine 1 to allow the trigger switch 8 to be operable. The trigger lock lever 7 is located on the rear grip 16.

The trigger switch 8 is operable by the user of the electric work machine 1 to drive the motor 12. The trigger switch 8 is located on the rear grip 16. The user of the electric work machine 1 holding the rear grip 16 with the hand operates the trigger lock lever 7 to operate the trigger switch 8 with a finger. A drive current is supplied to the motor 12 to drive the motor 12.

The guide bar 9 guides the saw chain 10. The guide bar 9 is a plate elongated in the front-rear direction. The guide bar 9 extends frontward from the housing 2.

The saw chain 10 functions as an output unit of the electric work machine 1 driven by the motor 12. The saw chain 10 includes multiple cutters that are connected to one another. The saw chain 10 is located along the peripheral edge of the guide bar 9. The motor 12 and the saw chain 10 are connected with a power transmission (not shown) including a sprocket. In response to the trigger switch 8 being operated to rotate the motor 12, the saw chain 10 moves along the peripheral edge of the guide bar 9.

Motor Assembly

Figure 2:
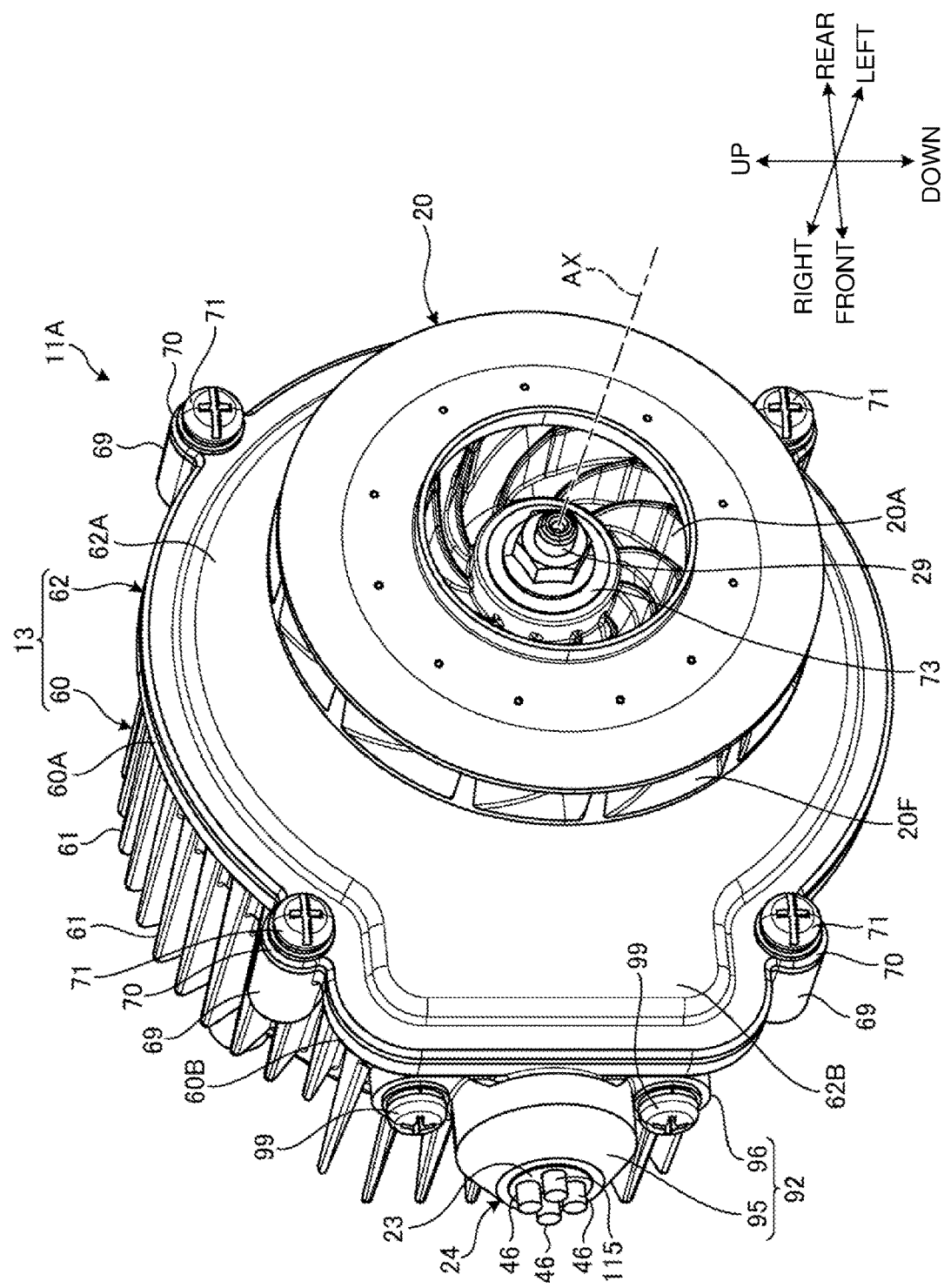
FIG. 2 is a left perspective view of a motor assembly in the first embodiment.
Figure 3:
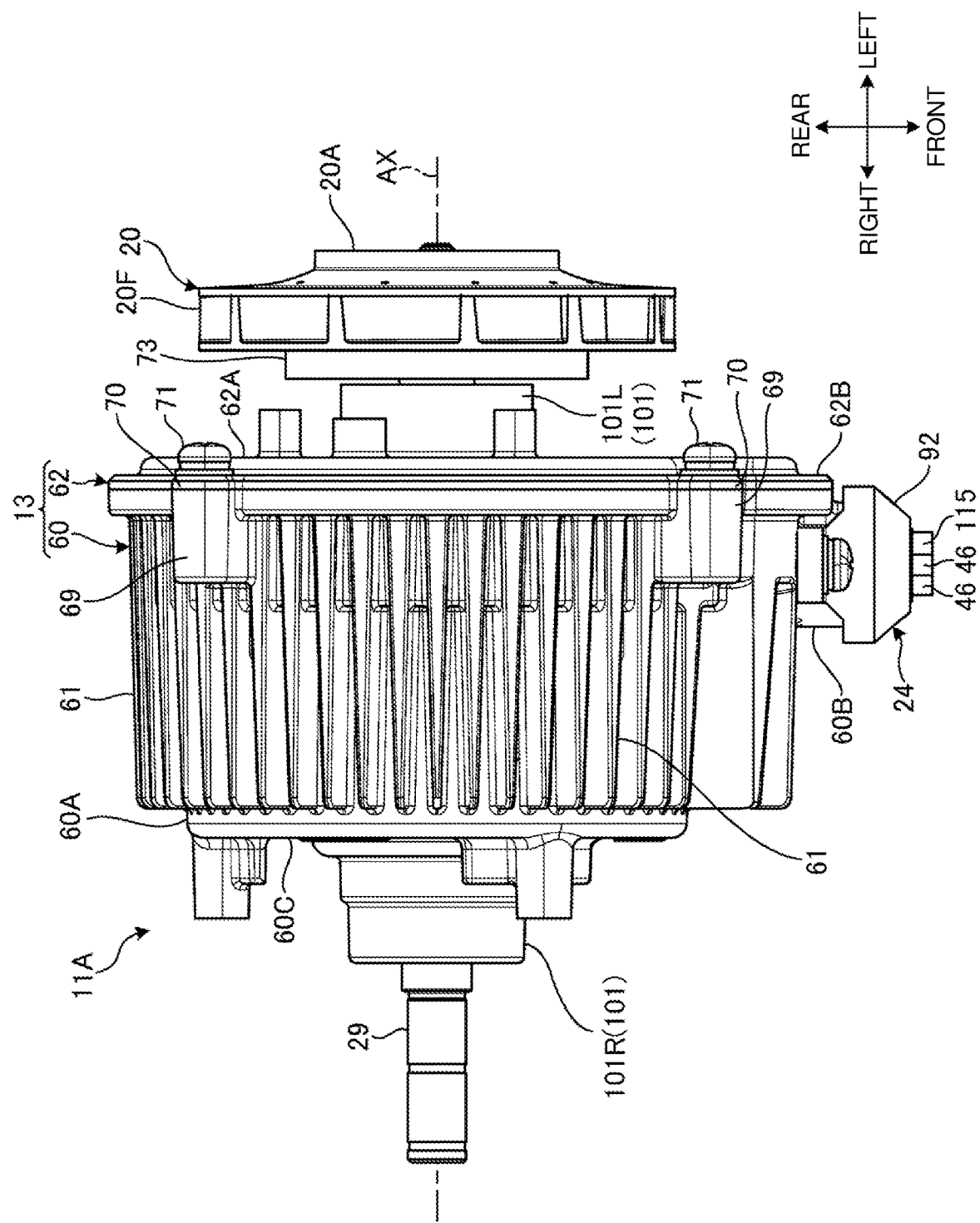
FIG. 3 is a side view of the motor assembly in the first embodiment.
Figure 4:
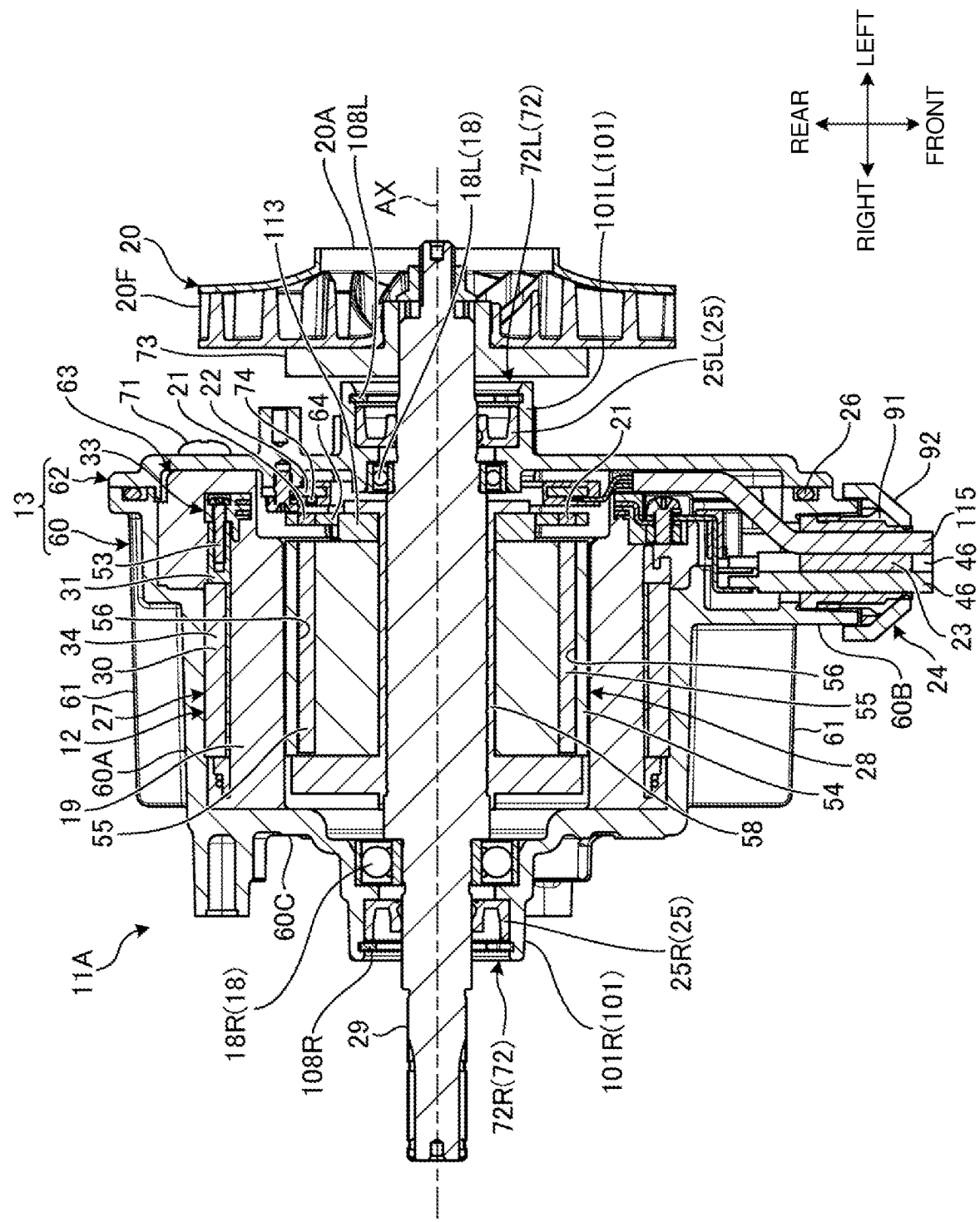
FIG. 4 is a longitudinal sectional view of the motor assembly in the first embodiment.
Figure 5:
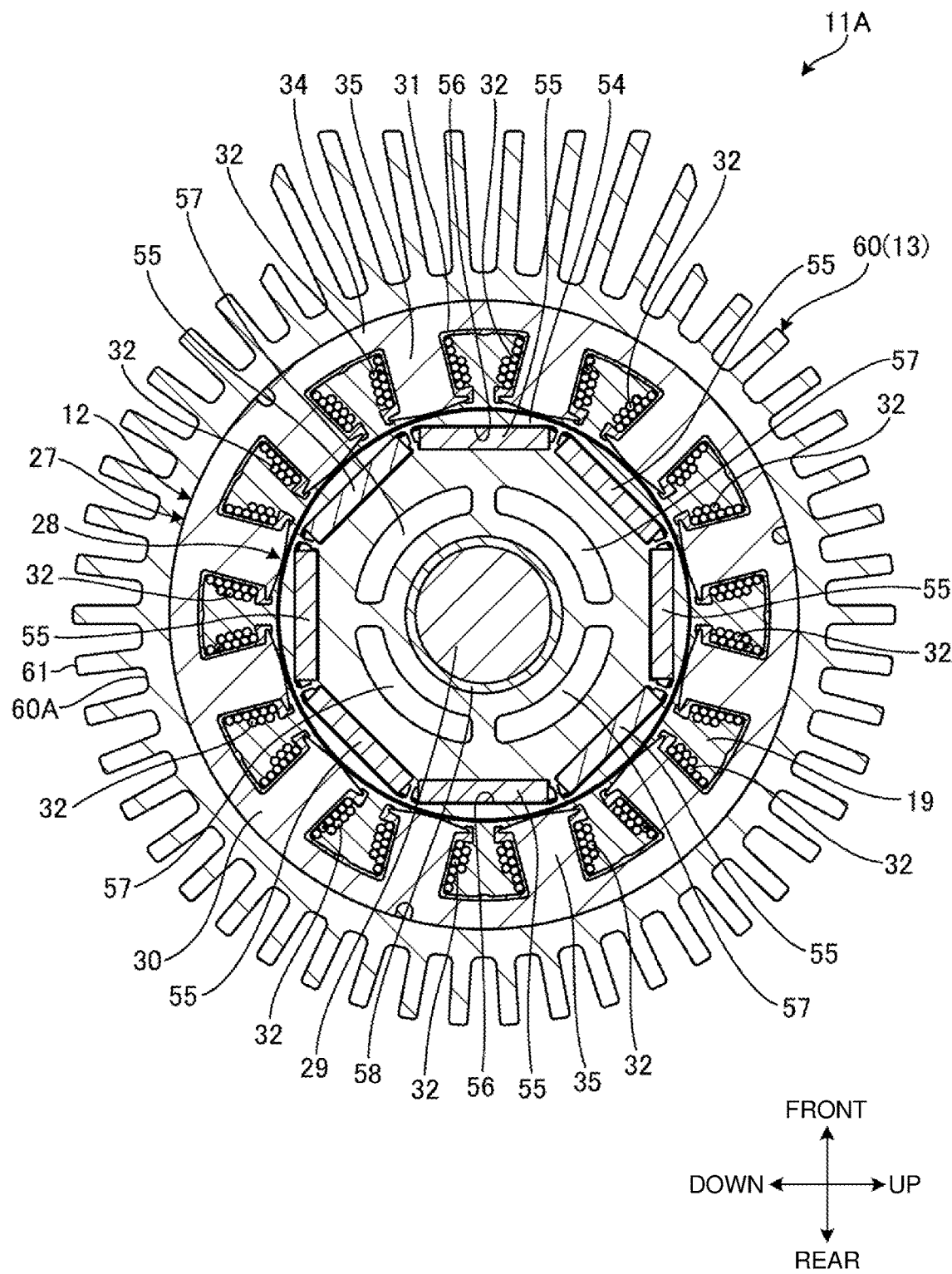
FIG. 5 is a cross-sectional view of the motor assembly in the first embodiment.
Figure 6:
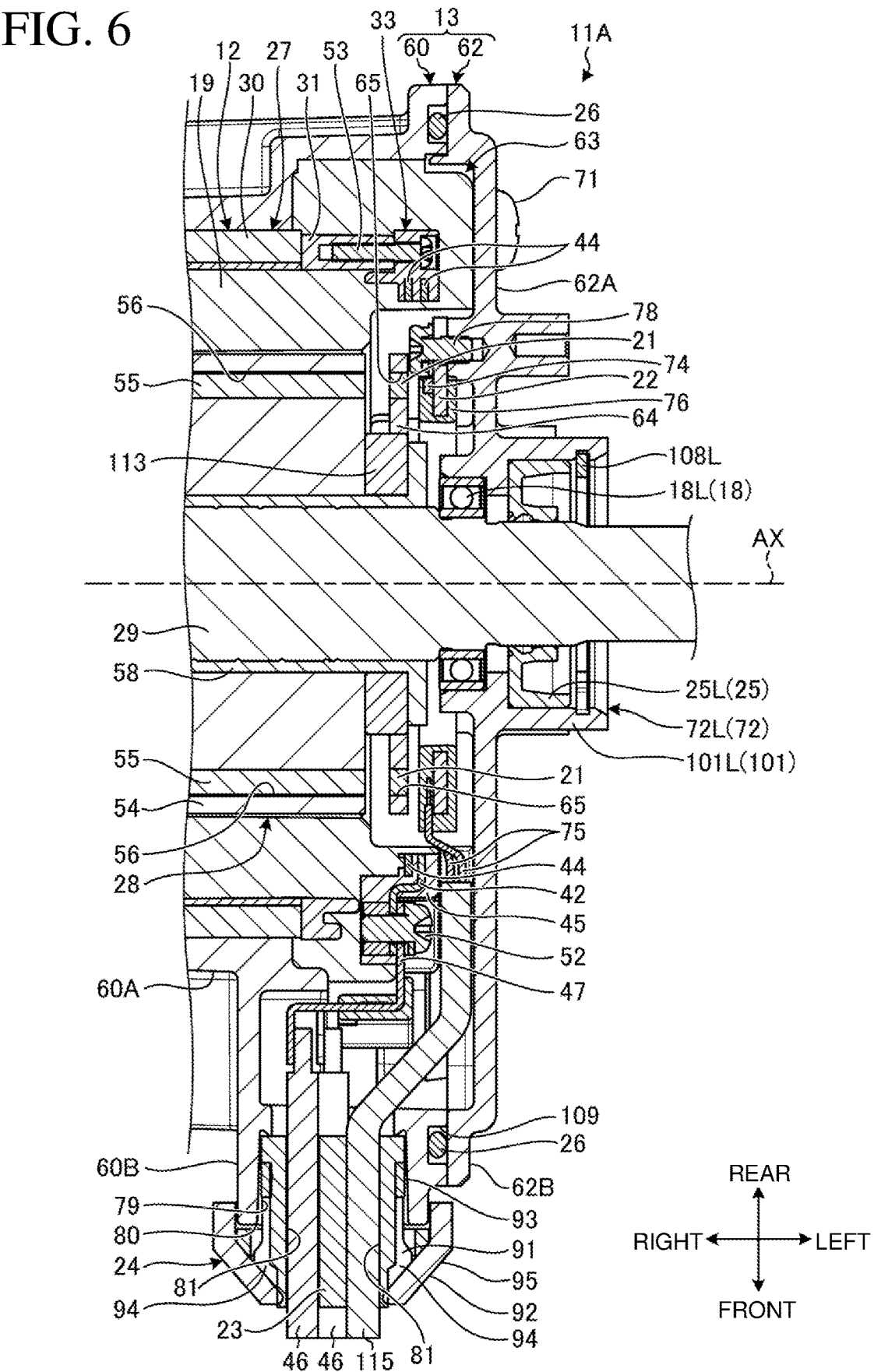
FIG. 6 is a partially enlarged longitudinal sectional view of the motor assembly in the first embodiment.

FIG. 2 is a left perspective view of the motor assembly 11A in the present embodiment. FIG. 3 is a side view of the motor assembly 11A in the present embodiment. FIG. 4 is a longitudinal sectional view of the motor assembly 11A in the present embodiment. FIG. 5 is a cross-sectional view of the motor assembly 11A in the present embodiment. FIG. 6 is a partially enlarged longitudinal sectional view of the motor assembly 11A in the present embodiment.

The motor assembly 11A includes the motor 12, a motor case 13, bearings 18, a heat-transfer resin portion 19, a cooling fan 20, a rotary member 64, a sensor board 22, a seal 23, a press assembly 24, seals 25, and a seal 26.

The motor 12 is a power source for the electric work machine 1. The motor 12 is an electric motor drivable with a drive current supplied from the battery pack.

The motor 12 is a brushless inner-rotor motor. The motor 12 includes a stator 27, a rotor 28, and a rotor shaft 29. The rotor 28 rotates relative to the stator 27. The rotor shaft 29 is fixed to the rotor 28. The stator 27 surrounds at least a part of the rotor 28. The rotor 28 rotates about the rotation axis AX. The saw chain 10 is driven by the rotor shaft 29.

The rotor 28 in the present embodiment has the rotation axis AX extending laterally. The axial direction parallel to the rotation axis AX of the rotor 28 corresponds to the lateral direction.

The stator 27 includes a stator core 30, an insulator 31, coils 32, and a busbar unit 33. The stator core 30 includes multiple steel plates stacked on one another. The steel plates are metal plates formed from iron as a main component. The stator core 30 includes an annular yoke 34 and teeth 35. The teeth 35 protrude radially inward from the inner surface of the yoke 34. The yoke 34 surrounds the rotation axis AX. Multiple (12 in the present embodiment) teeth 35 are located at circumferentially equal intervals.

The insulator 31 covers at least a part of the surface of the stator core 30. The insulator 31 covers at least the outer peripheral surfaces of the teeth 35. The insulator 31 is formed from a synthetic resin. The insulator 31 is fixed to the stator core 30. The insulator 31 is integral with the stator core 30. The insulator 31 is fixed to the stator core 30 by insert molding.

The coils 32 are wound around the teeth 35 with the insulator 31 in between. The coils 32 and the stator core 30 are insulated from each other by the insulator 31. Multiple (12 in the present embodiment) coils 32 are located circumferentially.

The busbar unit 33 is fastened to the insulator 31 with screws 53. A drive current from the battery pack is supplied to the busbar unit 33 through the controller 6.

The busbar unit 33 includes external terminals 42, short-circuiting members 44, and an insulating member 45.

The external terminals 42 are connected to the short-circuiting members 44 and to connection terminals 47. The external terminals 42 are connected to the coils 32 with the short-circuiting members 44. Each short-circuiting member 44 connects (short-circuits) a pair of coils 32 radially opposed to each other. The external terminals 42 are connected to the connection terminals 47, power lines 46, and the battery pack with the controller 6. Each external terminal 42 and the corresponding connection terminal 47 are fastened with a screw 52. The connection terminals 47 are connected to the power lines 46. The power lines 46 are lead wires connected to the coils 32 with the connection terminals 47, the external terminals 42, and the short-circuiting members 44. A drive current from the battery pack is supplied to the coils 32 through the controller 6, the power lines 46, the connection terminals 47, the external terminals 42, and the short-circuiting members 44.

The insulating member 45 is formed from a synthetic resin. The insulating member 45 surrounds the rotation axis AX. The short-circuiting members 44 are located inside the insulating member 45. The insulating member 45 supports the external terminals 42 and the short-circuiting members 44.

The controller 6 controls the drive current supplied from the battery pack to the busbar unit 33. A drive current from the battery pack is supplied to the external terminals 42 in the busbar unit 33 through the controller 6, the power lines 46, and the connection terminals 47. The drive current supplied from the battery pack to the external terminals 42 flows through the short-circuiting members 44, and is then supplied to the coils 32.

The rotor 28 includes a rotor core 54 and rotor magnets 55.

The rotor core 54 includes multiple steel plates stacked on one another. The steel plates are metal plates formed from iron as a main component. The rotor core 54 surrounds the rotation axis AX. The stator core 30 surrounds the rotor core 54.

The rotor magnets 55 are permanent magnets. The rotor magnets 55 are held by the rotor core 54. The rotor magnets 55 are located inside the rotor core 54. Multiple (eight in the present embodiment) rotor magnets 55 are located circumferentially.

The rotor core 54 has multiple magnet slots 56 located circumferentially at intervals. The magnet slots 56 extend through the right and left end faces of the rotor core 54. The rotor magnets 55 are received in the respective magnet slots 56.

The rotor core 54 in the present embodiment includes multiple (four in the present embodiment) hollow portions 57 located circumferentially at intervals. The hollow portions 57 extend through the right and the left end faces of the rotor core 54. The hollow portions 57 are located radially inward from the magnet slots 56. The hollow portions 57 reduce the weight of the rotor core 54.

The rotor shaft 29 extends in the axial direction. The rotor shaft 29 has the central axis aligned with the rotation axis AX. The rotor shaft 29 is located inward from the rotor core 54. The rotor core 54 is fixed to the rotor shaft 29. In the present embodiment, a cylindrical member 58 surrounds the rotor shaft 29. The cylindrical member 58 is formed from an electrically insulating material. The rotor shaft 29 is fixed to the rotor core 54 with the cylindrical member 58 in between. The rotor shaft 29 includes a left portion protruding leftward from the left end face of the rotor core 54. The rotor shaft 29 includes a right portion protruding rightward from the right end face of the rotor core 54.

A drive current is supplied to the coils 32 from the battery pack through the controller 6 to generate a rotating magnetic field in the stator 27. This causes the rotor 28 and the rotor shaft 29 to rotate about the rotation axis AX.

The motor case 13 accommodates at least a part of the motor 12. The motor case 13 in the present embodiment accommodates at least the stator 27 and the rotor 28. The motor case 13 has an internal space accommodating the stator 27 and the rotor 28. The stator 27 surrounds at least a part of the rotor 28 in the internal space of the motor case 13. The internal space is closed. The internal space in the present embodiment is sealed substantially hermetically. The rotor shaft 29 is partially located in the internal space.

The motor case 13 is formed from a metal. The motor case 13 in the present embodiment is formed from aluminum. The motor case 13 may be formed from an aluminum die-casting alloy (ADC12).

The motor case 13 includes a body 60, heat-radiating fins 61, and a lid 62.

The body 60 accommodates the stator 27 and the rotor 28. The stator 27 and the rotor 28 are located inside the body 60.

The body 60 includes a cylindrical portion 60A, an extension 60B, and a wall 60C. The cylindrical portion 60A surrounds the rotation axis AX. The extension 60B protrudes frontward from the cylindrical portion 60A. The wall 60C is connected to the right end of the cylindrical portion 60A. The body 60 and the extension 60B have an opening 63 in their left ends. The stator 27 is placed inside the body 60 through the opening 63.

The heat-radiating fins 61 are located on the outer surface of the cylindrical portion 60A. The heat-radiating fins 61 protrude radially outward from the outer surface of the cylindrical portion 60A. The heat-radiating fins 61 extend in the axial direction on the outer surface of the cylindrical portion 60A. Multiple heat-radiating fins 61 are located circumferentially at intervals.

The lid 62 is fastened to the body 60 to cover the opening 63. This defines an internal space between the body 60 and the lid 62. At least a part of the motor 12 including the stator 27 is placed inside the body 60, and then the opening 63 is covered with the lid 62. The motor 12 is thus at least partially located in the internal space.

The body 60 includes multiple (four in the present embodiment) screw bosses 69 located circumferentially at intervals about the opening 63. Each screw boss 69 has a threaded hole. The lid 62 includes multiple (four in the present embodiment) screw bosses 70 located at intervals on its peripheral edge. Each screw boss 70 has an opening. A screw 71 has its distal end fastened into the threaded hole in the corresponding screw boss 69, with its middle portion received in the opening of the screw boss 70. This structure fastens the body 60 and the lid 62.

The lid 62 includes a disk 62A and an extension 62B. The disk 62A is connected to the cylindrical portion 60A. The extension 62B is connected to the extension 60B. The extension 62B protrudes frontward from the disk 62A.

The bearings 18 support the rotor shaft 29. The rotor shaft 29 is rotatably supported by the bearings 18. The bearings 18 are supported on the motor case 13.

The motor case 13 has shaft holes 72 that at least partially receive the rotor shaft 29. The shaft holes 72 connect the internal space and the external space of the motor case 13. The shaft holes 72 include a shaft hole 72L and a shaft hole 72R. The shaft hole 72L receives the left portion of the rotor shaft 29. The shaft hole 72R receives the right portion of the rotor shaft 29. The shaft hole 72L is located in the disk 62A in the lid 62. The shaft hole 72R is located in the wall 60C of the body 60.

The motor case 13 includes peripheral walls 101 defining the shaft holes 72. The peripheral walls 101 are substantially cylindrical. The peripheral walls 101 include a peripheral wall 101L and a peripheral wall 101R. The peripheral wall 101L defines the shaft hole 72L. The peripheral wall 101R defines the shaft hole 72R. The peripheral wall 101L is located on the disk 62A in the lid 62. The peripheral wall 101L protrudes leftward from the left surface of the disk 62A. The peripheral wall 101R is located on the wall 60C of the body 60. The peripheral wall 101R protrudes rightward from the right surface of the wall 60C.

The bearings 18 include a left bearing 18L and a right bearing 18R. The left bearing 18L supports the left portion of the rotor shaft 29. The right bearing 18R supports the right portion of the rotor shaft 29. The left bearing 18L is received in the shaft hole 72L. The right bearing 18R is received in the shaft hole 72R.

The right and left ends of the rotor shaft 29 are located outside the motor case 13. The right end of the rotor shaft 29 is connected to the saw chain 10 with the power transmission (not shown) including the sprocket. The saw chain 10 is driven by the rotor shaft 29. The rotor shaft 29 rotates to drive the saw chain 10.

The heat-transfer resin portion 19 is accommodated in the motor case 13. The heat-transfer resin portion 19 is in contact with the coils 32 and the motor case 13. The heat-transfer resin portion 19 covers the coils 32. The heat-transfer resin portion 19 in the present embodiment is in contact with the stator core 30 and the insulator 31.

The heat-transfer resin portion 19 is formed from a synthetic resin. The heat-transfer resin portion 19 is highly thermally conductive and electrically insulating. For example, when the insulator 31 is formed from a nylon resin with a thermal conductivity of 0.2 W/(m·K), the thermal conductivity of the synthetic resin used for the heat-transfer resin portion 19 is higher than 0.2 W/(m·K).

An insulating synthetic resin with a thermal conductivity higher than 0.2 W/(m·K) is, for example, an unsaturated polyester resin. The heat-transfer resin portion 19 may be formed from a nylon resin containing insulating, thermally conductive fillers.

After the stator 27 is placed inside the body 60 through the opening 63, a heated and melted synthetic resin is fed inside the body 60 through the opening 63. The synthetic resin fed inside the body 60 solidifies to form the heat-transfer resin portion 19.

The cooling fan 20 is located outside the motor case 13. The cooling fan 20 faces at least a part of the outer surface of the motor case 13. The cooling fan 20 is fixed to the rotor shaft 29. The cooling fan 20 is rotated by the rotor shaft 29.

The cooling fan 20 in the present embodiment is located leftward from the motor case 13. The cooling fan 20 is fixed to the left end of the rotor shaft 29 located outside the motor case 13. The cooling fan 20 faces at least a part of the outer surface of the motor case 13. The cooling fan 20 in the present embodiment faces at least a part of the lid 62.

The cooling fan 20 in the present embodiment is a centrifugal fan. The cooling fan 20 has an inflow port 20A and an outflow port 20F. The inflow port 20A is located at the left end of the cooling fan 20. The outflow port 20F is located on the periphery of the cooling fan 20. The cooling fan 20 generates an airflow to cool the motor case 13. As the rotor shaft 29 rotates, the cooling fan 20 rotates together with the rotor shaft 29. Air around the cooling fan 20 is then drawn through the inflow port 20A. The air drawn through the inflow port 20A is blown out through the outflow port 20F. At least a part of the air blown out through the outflow port 20F hits the outer surface of the motor case 13. The motor case 13 is thus cooled.

The cooling fan 20 in the present embodiment is fixed to the rotor shaft 29 with a fan bush 73. The fan bush 73 is an intermediate member connecting the rotor shaft 29 and the cooling fan 20. The fan bush 73 is located outside the motor case 13 to connect the left end of the rotor shaft 29 and the cooling fan 20. As the cooling fan 20 rotates, the fan bush 73 rotates together with the cooling fan 20.

The rotary member 64 supports sensor magnets 21. The rotary member 64 is located inside the motor case 13. The rotary member 64 is fixed to the rotor shaft 29 inside the motor case 13.

In the present embodiment, a sleeve 113 surrounds the rotor shaft 29. The sleeve 113 is fixed to the rotor shaft 29. The sleeve 113 is formed from a metal such as brass. The sleeve 113 functions as a rotational balancer that corrects any rotational imbalance of the rotor 28.

The rotary member 64 surrounds the sleeve 113. The rotary member 64 is fixed to the sleeve 113. The rotary member 64 is fixed to the rotor shaft 29 with the sleeve 113 in between. As the rotor shaft 29 rotates, the rotary member 64 rotates together with the rotor shaft 29.

The sensor magnets 21 are fixed to the rotary member 64. The sensor magnets 21 are permanent magnets. Multiple (eight in the present embodiment) sensor magnets 21 are located circumferentially at intervals. The sensor magnets 21 and the rotor magnets 55 are at the same positions in the circumferential direction.

The sensor magnets 21 are located inside the rotary member 64. The rotary member 64 in the present embodiment has multiple magnet slots 65 located circumferentially at intervals. The magnet slots 65 extend through the right and left end faces of the rotary member 64. The sensor magnets 21 are received in the respective magnet slots 65.

The sensor magnets 21 are rotated by the rotor 28. As the rotary member 64 is rotated by the rotor 28 and the rotor shaft 29, the sensor magnets 21 rotate.

The sensor board 22 supports magnetic sensors 74. The sensor board 22 is located inside the motor case 13. The sensor board 22 is annular. The sensor board 22 surrounds the rotor shaft 29. The sensor board 22 includes a printed wiring board (PWB). The sensor board 22 is formed from, for example, an epoxy resin. The sensor board 22 may be formed from a metal, such as aluminum, or from a heat-radiating resin with a higher thermal conductivity than an epoxy resin.

In the axial direction, the sensor board 22 is located between at least a part of the motor case 13 and the sensor magnets 21. The sensor board 22 is fixed to the motor case 13. The sensor board 22 is fastened to the lid 62 with screws 78.

The magnetic sensors 74 detect the sensor magnets 21. Each magnetic sensor 74 is, for example, a Hall device. The magnetic sensors 74 detect the sensor magnets 21 to detect rotation of the rotor 28. Five signal lines 75 are connected to the sensor board 22. The magnetic sensors 74 transmit detection signals to the controller 6 through the signal lines 75. The five signal lines 75 in the present embodiment are bundled together with a tube 115.

In the axial direction, the rotary member 64 is located between the sensor board 22 and the rotor 28. The magnetic sensors 74 are supported by the sensor board 22 to face the sensor magnets 21.

In the present embodiment, a resin film 76 covers the magnetic sensors 74 and at least a part of the surface of the sensor board 22. The resin film 76 functions as a heat insulating film.

The motor case 13 includes a wiring path 79 connecting the internal space and the external space of the motor case 13. The wiring path 79 is defined in the extension 60B of the body 60. The wiring path 79 has an insertion end opening 80 facing the outer space of the motor case 13. The insertion end opening 80 is located in the front end of the wiring path 79.

The power lines 46 are received in the wiring path 79. The power lines 46 are connected to the coils 32 with the connection terminals 47 and the busbar unit 33.

The seal 23 seals between each power line 46 and the motor case 13. The seal 23 seals between the tube 115 and the motor case 13. The seal 23 is substantially cylindrical. The seal 23 is formed from rubber. The seal 23 is received in the wiring path 79. The seal 23 is placed into the wiring path 79 through the insertion end opening 80.

The seal 23 has four holes 81 receiving the three power lines 46 and a single tube 115. The four holes 81 are parallel to one another. Each hole 81 receives the corresponding power line 46. One hole 81 receives the tube 115. The outer surface of each power line 46 and the inner surface of the corresponding hole 81 are in close contact with each other. The outer surface of the tube 115 and the inner surface of the hole 81 are in close contact with each other.

The press assembly 24 applies pressure to the seal 23 received in the wiring path 79. The press assembly 24 compresses the seal 23 to cause the inner surface of each hole 81 in the seal 23 to be in close contact with the outer surface of the corresponding power line 46. The press assembly 24 compresses the seal 23 to cause the outer surface of the tube 115 and the inner surface of the hole 81 to be in close contact with each other. The press assembly 24 presses the seal 23 against the motor case 13 to cause the seal 23 and at least a part of the motor case 13 to be in close contact with each other.

The press assembly 24 includes a press member 91 and a cover 92. The press member 91 includes a ring 93 and multiple tabs 94. The ring 93 surrounds the seal 23. The multiple tabs 94 are connected to the ring 93.

The ring 93 surrounds the seal 23. The tabs 94 are connected to a front portion of the ring 93. The multiple tabs 94 surround the seal 23. The tabs 94 are elastically deformable to move toward each other. In other words, the press member 91 is elastically deformable to have a smaller diameter at the tabs 94.

With the cover 92 in contact with the press member 91, the cover 92 is fixed to the motor case 13. The cover 92 includes a peripheral wall 95 and fasteners 96. The peripheral wall 95 surrounds the tabs 94. The fasteners 96 are fixed to the motor case 13.

With the inner surface of the peripheral wall 95 and the tabs 94 in contact with each other, the cover 92 is fastened to the motor case 13 with screws 99. The cover 92 then moves backward toward the motor case 13. The peripheral wall 95 causes the multiple tabs 94 to elastically deform to move toward each other. The multiple tabs 94 thus compress the seal 23. This causes the outer surface of the power line 46 to come in close contact with the inner surface of the hole 81, and the outer surface of the tube 115 to come in close contact with the inner surface of the hole 81.

When the cover 92 moves backward, the press member 91 moves backward together with the cover 92. This causes the seal 23 to move backward together with the press member 91 and be pressed against at least a portion of the motor case 13. The seal 23 and the motor case 13 are thus in close contact with each other.

The outer surface of each power line 46 and the inner surface of the corresponding hole 81 being in close contact with each other seal between each power line 46 and the seal 23. The outer surface of the tube 115 and the inner surface of the hole 81 being in close contact with each other seal between the tube 115 and the seal 23. The seal 23 and the motor case 13 being in close contact with each other seal between the seal 23 and the motor case 13. Thus, the seal 23 seals between each power line 46 and the motor case 13 and between the tube 115 and the motor case 13.

The seals 25 seal between the rotor shaft 29 and the motor case 13. The seals 25 include oil seals. The seals 25 are received in the shaft holes 72. The seals 25 are press-fitted between the rotor shaft 29 and the peripheral walls 101. The seals 25 are supported by the peripheral walls 101. The seals 25 include a seal 25L and a seal 25R. The seal 25L seals between the left portion of the rotor shaft 29 and the motor case 13. The seal 25R seals between the right portion of the rotor shaft 29 and the motor case 13. The seal 25L is received in the shaft hole 72L. The seal 25R is received in the shaft hole 72R.

A stopper 108L is located at the left of the seal 25L. A stopper 108R is located at the right of the seal 25R. The stopper 108L prevents the seal 25L from slipping out of the shaft hole 72L. The stopper 108R prevents the seal 25R from slipping out of the shaft hole 72R. The stopper 108L and the stopper 108R are, for example, circlips.

The seal 26 seals between the body 60 and the lid 62. The seal 26 includes an O-ring. The body 60 has a recess 109 surrounding the opening 63. The seal 26 is received in the recess 109.

As described above, the electric work machine 1 according to the present embodiment includes the motor 12 and the saw chain 10 that is an output unit. The motor 12 includes the stator 27, the rotor 28 rotatable relative to the stator 27, and the rotor shaft 29 fixed to the rotor 28. The saw chain 10 is driven by the rotor shaft 29. The electric work machine 1 includes the motor case 13 accommodating the stator 27 and the rotor 28. The electric work machine 1 includes the sensor magnets 21 located inside the motor case 13 and rotatable by the rotor 28. The electric work machine 1 includes the sensor board 22 located inside the motor case 13 and supporting the magnetic sensors 74 that detect the sensor magnets 21.

In the above structure, the sensor magnets 21 are rotated by the rotor 28, and the magnetic sensors 74 then detect the sensor magnets 21 to detect rotation of the rotor 28. The sensor magnets 21 and the sensor board 22 inside the motor case 13 are protected by the motor case 13. The detection accuracy of the magnetic sensors 74 is thus less likely to be reduced.

For example, for the sensor magnets 21 outside the motor case 13, magnetic materials such as iron powder around the motor case 13 may adhere to the sensor magnets 21. For the sensor board 22 outside the motor case 13, the magnetic sensors 74 may deteriorate. The sensor magnets 21 with such magnetic materials or the deteriorating magnetic sensors 74 may reduce the detection accuracy of the magnetic sensors 74. The motor case 13 protects the sensor magnets 21 and the sensor board 22. The detection accuracy of the magnetic sensors 74 is thus less likely to be reduced. The controller 6 controls the motor 12 based on detection signals obtained by the magnetic sensors 74 that have the detection accuracy less likely to be reduced. The electric work machine 1 is thus driven appropriately.

In the present embodiment, the sensor board 22 is located between at least a part of the motor case 13 and the sensor magnets 21 in the axial direction parallel to the rotation axis AX of the rotor 28.

This structure can avoid a size increase of the motor assembly 11A including the motor case 13, the sensor magnets 21, and the sensor board 22.

In the present embodiment, the sensor board 22 is fixed to the motor case 13.

This structure reduces the likelihood that the relative positions between the motor case 13 and the sensor board 22 change.

The motor case 13 in the present embodiment includes the body 60 having the opening 63 and accommodating the stator 27 and the rotor 28, and the lid 62 fastened to the body 60 and covering the opening 63. The sensor board 22 is fastened to the lid 62.

With the lid 62 to which the sensor board 22 is fastened is fastened to the body 60, the sensor board 22 is accommodated inside the motor case 13.

The electric work machine 1 according to the present embodiment includes the rotary member 64 fixed to the rotor shaft 29 inside the motor case 13. The sensor magnets 21 detected by the magnetic sensors 74 are fixed to the rotary member 64.

In the above structure, the sensor magnets 21 fixed to the rotary member 64 are detected by the magnetic sensors 74. The magnetic sensors 74 are thus less susceptible to heat from the rotor 28. As the motor 12 is driven, the rotor 28 may reach high temperature and generate heat. When the rotor magnets 55 are detected by the magnetic sensors 74, the sensor board 22 is to be placed near the rotor 28. Heat from the rotor 28 may thus disable the magnetic sensors 74 from operating appropriately. The rotary member 64 is less likely to reach high temperature. Although the sensor board 22 is located adjacent to the rotary member 64, the magnetic sensors 74 detect the sensor magnets 21 and can thus operate appropriately. For the structure in which the rotary member 64 and the rotor 28 are both inside the motor case 13, the sensor magnets 21 and the rotor magnets 55 can be magnetized simultaneously in the process of producing the sensor magnets 21 and the rotor magnets 55. More specifically, the rotary member 64 and the rotor 28 fixed on the rotor shaft 29 can be together placed into a magnetizer. The sensor magnets 21 and the rotor magnets 55 are less likely to be misaligned in the rotational direction. The controller 6 can control the motor 12 appropriately based on detection signals obtained by the magnetic sensors 74 detecting the sensor magnets 21.

In the present embodiment, the rotary member 64 is located between the sensor board 22 and the rotor 28 in the axial direction parallel to the rotation axis AX of the rotor 28.

This increases the distance between the sensor board 22 and the rotor 28. The magnetic sensors 74 are thus less susceptible to heat from the rotor 28. The rotary member 64 between the sensor board 22 and the rotor 28 blocks radiant heat from the rotor 28 and reduces heat transfer to the sensor board 22. The magnetic sensors 74 thus operate appropriately.

The sensor board 22 in the present embodiment may be formed from a metal or a heat-radiating resin.

The sensor board 22 formed from the heat-radiating material can reduce a temperature increase in the sensor board 22 when heat from the rotor 28 is transferred to the sensor board 22. The sensor board 22 is connected to the motor case 13 to cause heat in the sensor board 22 to be transferred to the motor case 13 and radiate from the motor case 13. The magnetic sensors 74 thus operate appropriately.

The electric work machine 1 according to the present embodiment includes the cooling fan 20 located outside the motor case 13 and rotatable by the rotor shaft 29.

The rotor shaft 29 rotates the cooling fan 20 to cool the motor case 13. The sensor board 22 is less likely to increase temperature. The magnetic sensors 74 thus operate appropriately. The motor case 13 is cooled to reduce a temperature increase in the motor 12. The motor 12 thus operates appropriately. This also reduces the likelihood that electronic devices accommodated in the motor case 13 malfunction under heat or electronic components accommodated in the motor case 13 deteriorate under heat. The electric work machine 1 is thus driven appropriately.

The cooling fan 20 in the present embodiment is fixed to the end of the rotor shaft 29 located outside the motor case 13.

This structure allows the cooling fan 20 to rotate together with the rotor shaft 29 outside the motor case 13.

The cooling fan 20 in the present embodiment faces at least a part of the outer surface of the motor case 13.

In the above structure, the cooling fan 20 can efficiently direct air onto the outer surface of the motor case 13.

Second Embodiment

A second embodiment will now be described. The same or corresponding components as those in the above embodiment are given the same reference numerals herein and will be described briefly or will not be described.

Figure 7:
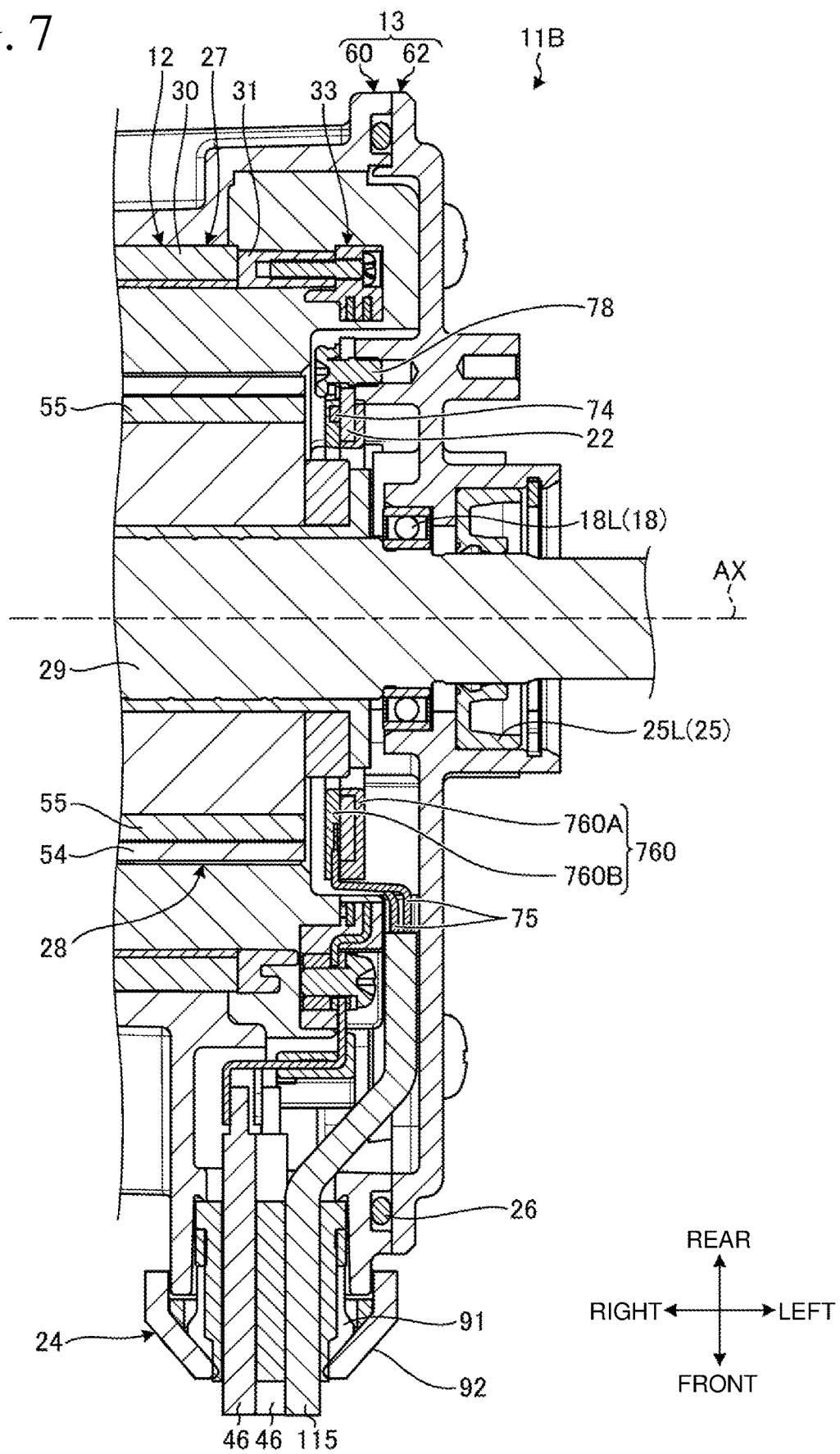
FIG. 7 is a partially enlarged longitudinal sectional view of a motor assembly in a second embodiment.

FIG. 7 is a partially enlarged longitudinal sectional view of a motor assembly 11B in the present embodiment. As shown in FIG. 7, the motor assembly 11B includes the sensor board 22 located inside the motor case 13. The sensor board 22 supports the magnetic sensors 74. As in the first embodiment, the sensor board 22 may be formed from an epoxy resin, a metal, or a heat-radiating resin with a higher thermal conductivity than an epoxy resin.

The motor assembly 11B in the present embodiment does not include the rotary member 64 and the sensor magnets 21 unlike in the first embodiment. The magnetic sensors 74 detect the rotor magnets 55 rotated by the rotor 28. The rotor 28 including the rotor magnets 55 is located inside the motor case 13.

The motor assembly 11B in the present embodiment includes a heat insulating plate 760 covering the magnetic sensors 74 and at least a part of the surface of the sensor board 22. The heat insulating plate 760 is formed from a synthetic resin.

Figure 8:
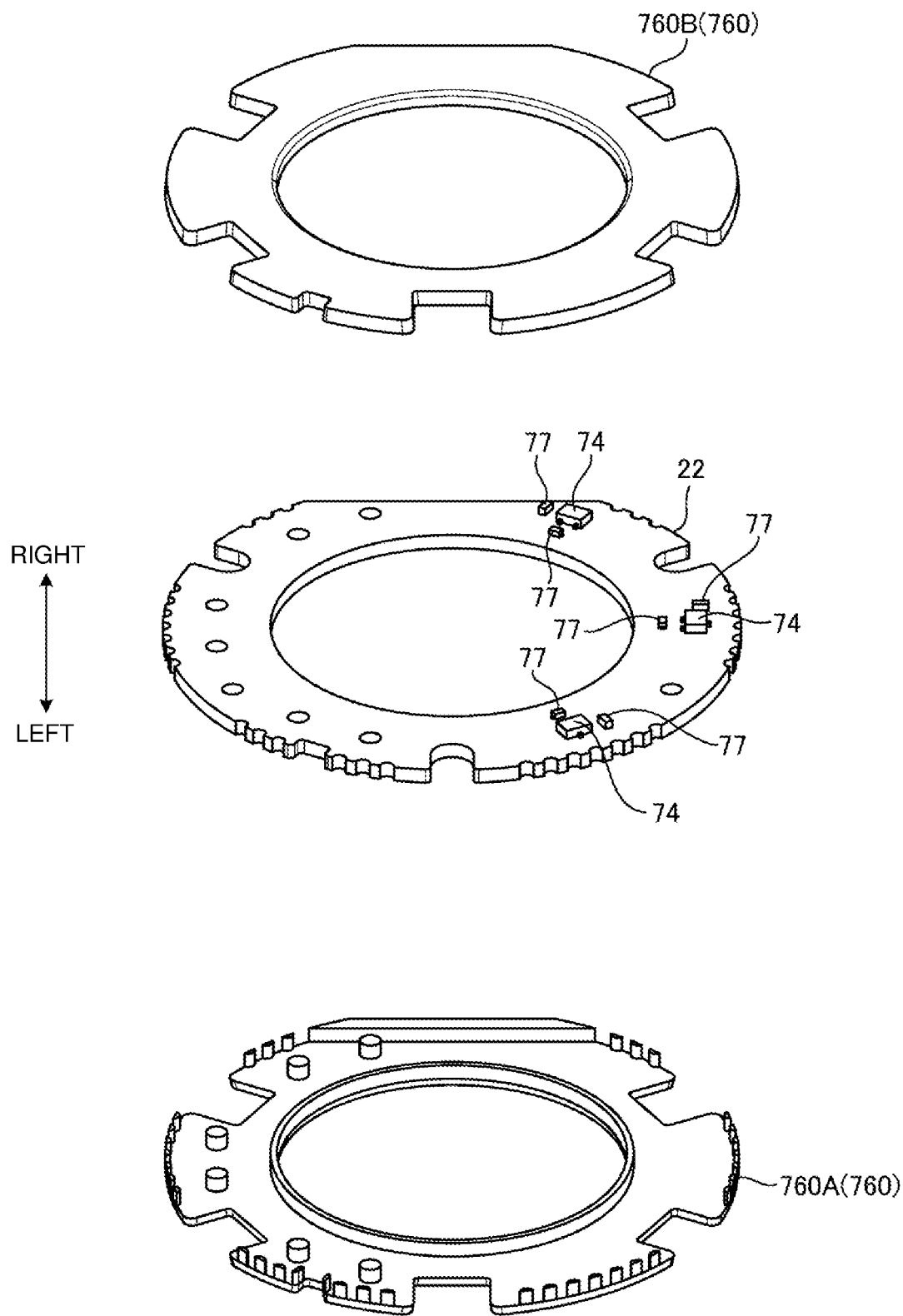
FIG. 8 is an exploded perspective view of a sensor board and a heat insulating plate in the second embodiment.

FIG. 8 is an exploded perspective view of the sensor board 22 and the heat insulating plate 760 in the present embodiment. The heat insulating plate 760 includes a first heat insulating plate 760A and a second heat insulating plate 760B. The first heat insulating plate 760A covers the left surface of the sensor board 22. The second heat insulating plate 760B covers the right surface of the sensor board 22. The magnetic sensors 74 are located on the right surface of the sensor board 22. The sensor board 22 includes, in addition to the magnetic sensors 74, multiple electronic components 77 on its right surface. The electronic components 77 mounted on the sensor board 22 are, for example, a capacitor, a resistor, a diode, and a thermistor. The second heat insulating plate 760B covers the magnetic sensors 74 and the electronic components 77.

As described above, the motor assembly 11B in the present embodiment includes the heat insulating plate 760 covering the magnetic sensors 74 and at least a part of the surface of the sensor board 22.

In the above structure, heat from the rotor 28 is blocked by the heat insulating plate 760 and thus is restricted from being transferred to the magnetic sensors 74 and to the sensor board 22. The magnetic sensors 74 and the sensor board 22 are also protected by the heat insulating plate 760. The magnetic sensors 74 thus operate appropriately.

Third Embodiment

A third embodiment will now be described. The same or corresponding components as those in the above embodiment are given the same reference numerals herein and will be described briefly or will not be described.

Figure 9:
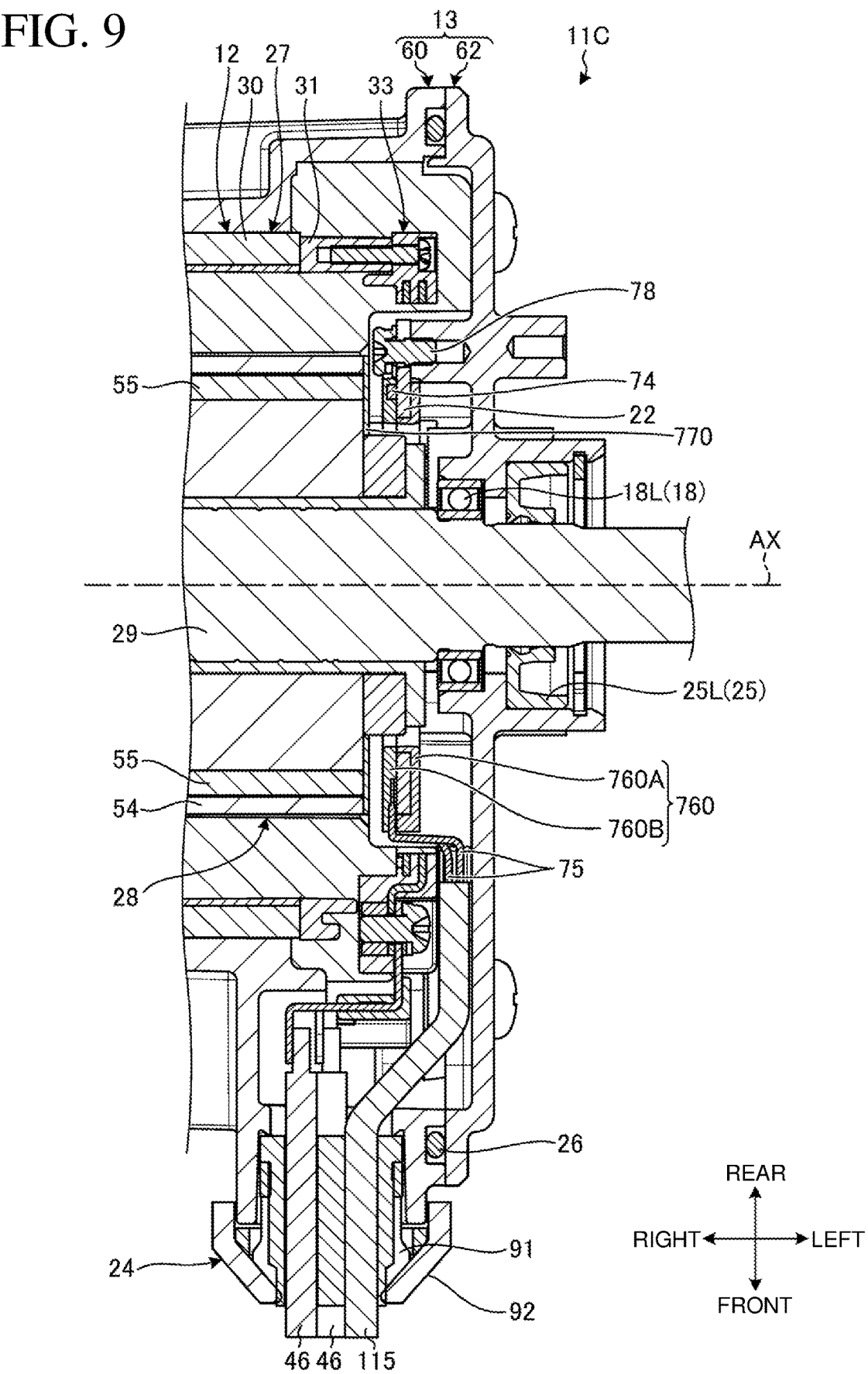
FIG. 9 is a partially enlarged longitudinal sectional view of a motor assembly in a third embodiment.

FIG. 9 is a partially enlarged longitudinal sectional view of a motor assembly 11C in the present embodiment. As shown in FIG. 9, the motor assembly 11C includes the sensor board 22 located inside the motor case 13. The sensor board 22 supports the magnetic sensors 74. As in the first embodiment, the sensor board 22 may be formed from an epoxy resin, a metal, or a heat-radiating resin with a higher thermal conductivity than an epoxy resin.

The motor assembly 11C includes a heat insulator 770 between the sensor board 22 and the rotor 28 in the axial direction. The heat insulator 770 is, for example, a plate formed from a synthetic resin. The heat insulator 770 is fixed to the left end face of the rotor 28 facing the sensor board 22.

As described above, the motor assembly 11C in the present embodiment includes the heat insulator 770 between the sensor board 22 and the rotor 28 in the axial direction parallel to the rotation axis AX of the rotor 28.

In the above structure, heat from the rotor 28 is blocked by the heat insulator 770 and thus is restricted from being transferred to the sensor board 22. The magnetic sensors 74 thus operate appropriately.

The heat insulator 770 in the present embodiment is fixed to the left end face of the rotor 28 facing the sensor board 22.

Thus, the heat insulator 770 rotates together with the rotor 28. The motor assembly 11C can also avoid a size increase.

Fourth Embodiment

A fourth embodiment will now be described. The same or corresponding components as those in the above embodiment are given the same reference numerals herein and will be described briefly or will not be described.

Figure 10:
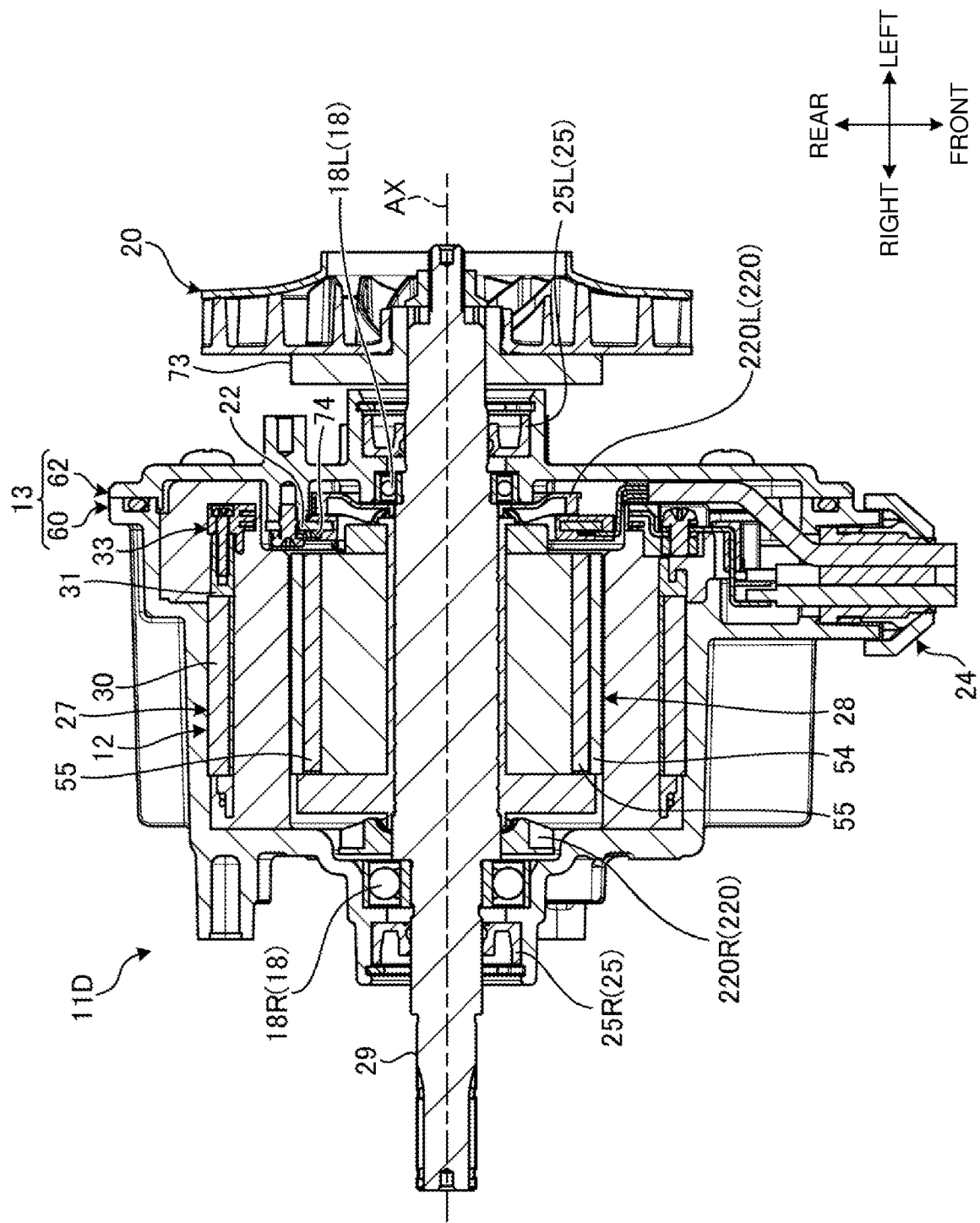
FIG. 10 is a longitudinal sectional view of a motor assembly in a fourth embodiment.
Figure 11:
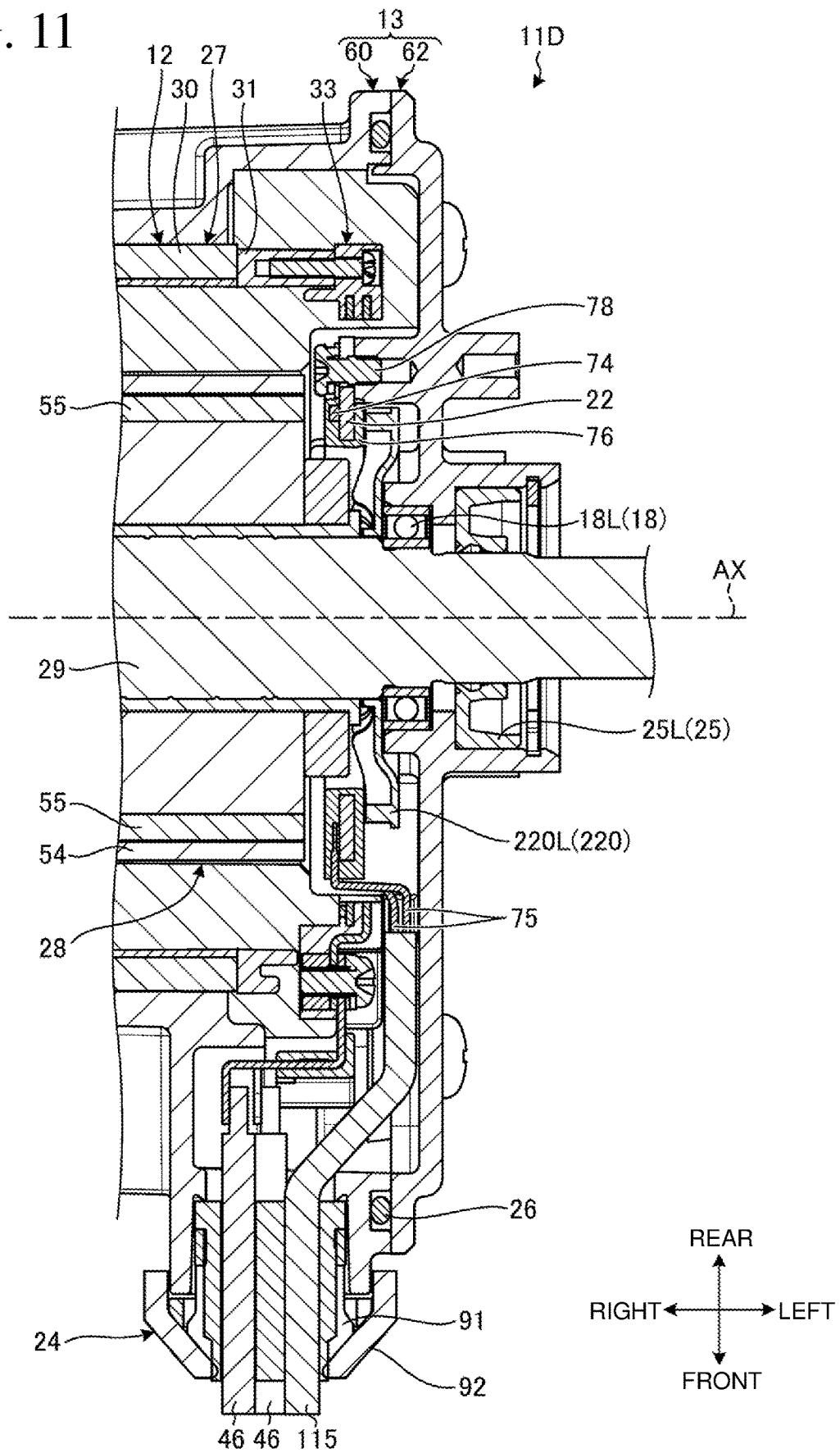
FIG. 11 is a partially enlarged longitudinal sectional view of the motor assembly in the fourth embodiment.

FIG. 10 is a longitudinal sectional view of a motor assembly 11D in the present embodiment. FIG. 11 is a partially enlarged longitudinal sectional view of the motor assembly 11D in the present embodiment. As shown in FIGS. 10 and 11, the motor assembly 11D includes the sensor board 22 located inside the motor case 13. The sensor board 22 supports the magnetic sensors 74. As in the first embodiment, the sensor board 22 may be formed from an epoxy resin, a metal, or a heat-radiating resin with a higher thermal conductivity than an epoxy resin.

The motor assembly 11D includes stirring fans 220 located inside the motor case 13 and rotatable by the rotor shaft 29. The stirring fans 220 are fixed to the rotor shaft 29 inside the motor case 13. The stirring fans 220 include a stirring fan 220L and a stirring fan 220R. The stirring fan 220L is fixed to the left portion of the rotor shaft 29. The stirring fan 220R is fixed to the right portion of the rotor shaft 29. As the rotor shaft 29 rotates, the stirring fans 220 rotate together with the rotor shaft 29 in the motor case 13. This stirs the air inside the motor case 13.

As described above, the motor assembly 11D includes the stirring fans 220 inside the motor case 13 and rotatable by the rotor shaft 29.

With the air inside the motor case 13 being stirred by the stirring fans 220, heat from the air is more easily transferred to the motor case 13. The heat transferred to the motor case 13 radiates from the motor case 13. This reduces a temperature increase in the motor case 13. The magnetic sensors 74 thus operate appropriately.

The stirring fans 220 in the present embodiment are fixed to the rotor shaft 29 inside the motor case 13.

The stirring fans 220 can thus rotate together with the rotor shaft 29 inside the motor case 13.

Fifth Embodiment

A fifth embodiment will now be described. The same or corresponding components as those in the above embodiment are given the same reference numerals herein and will be described briefly or will not be described.

Figure 12:
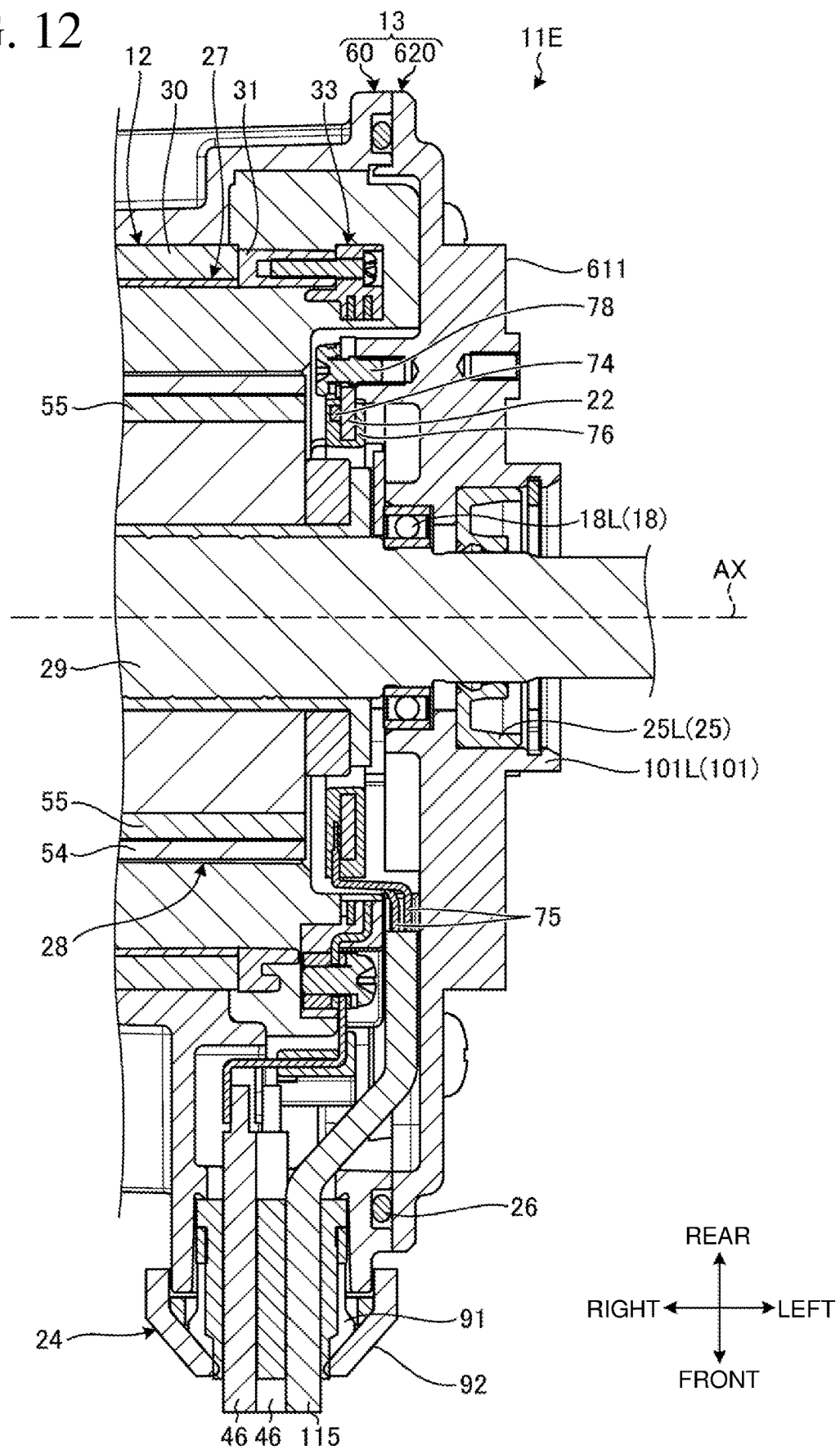
FIG. 12 is a partially enlarged longitudinal sectional view of a motor assembly in a fifth embodiment.
Figure 13:
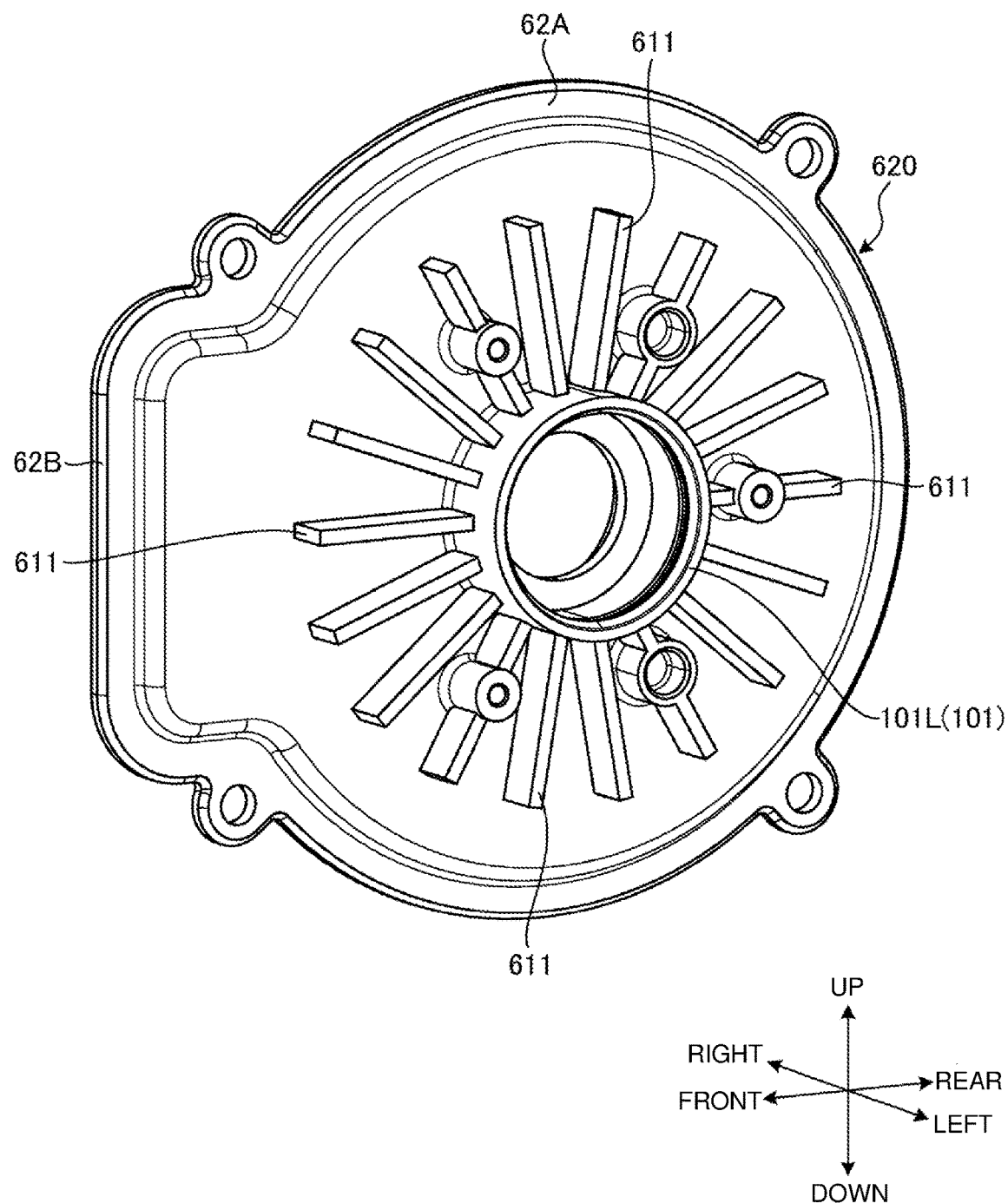
FIG. 13 is a left perspective view of a lid in the fifth embodiment.
Figure 14:
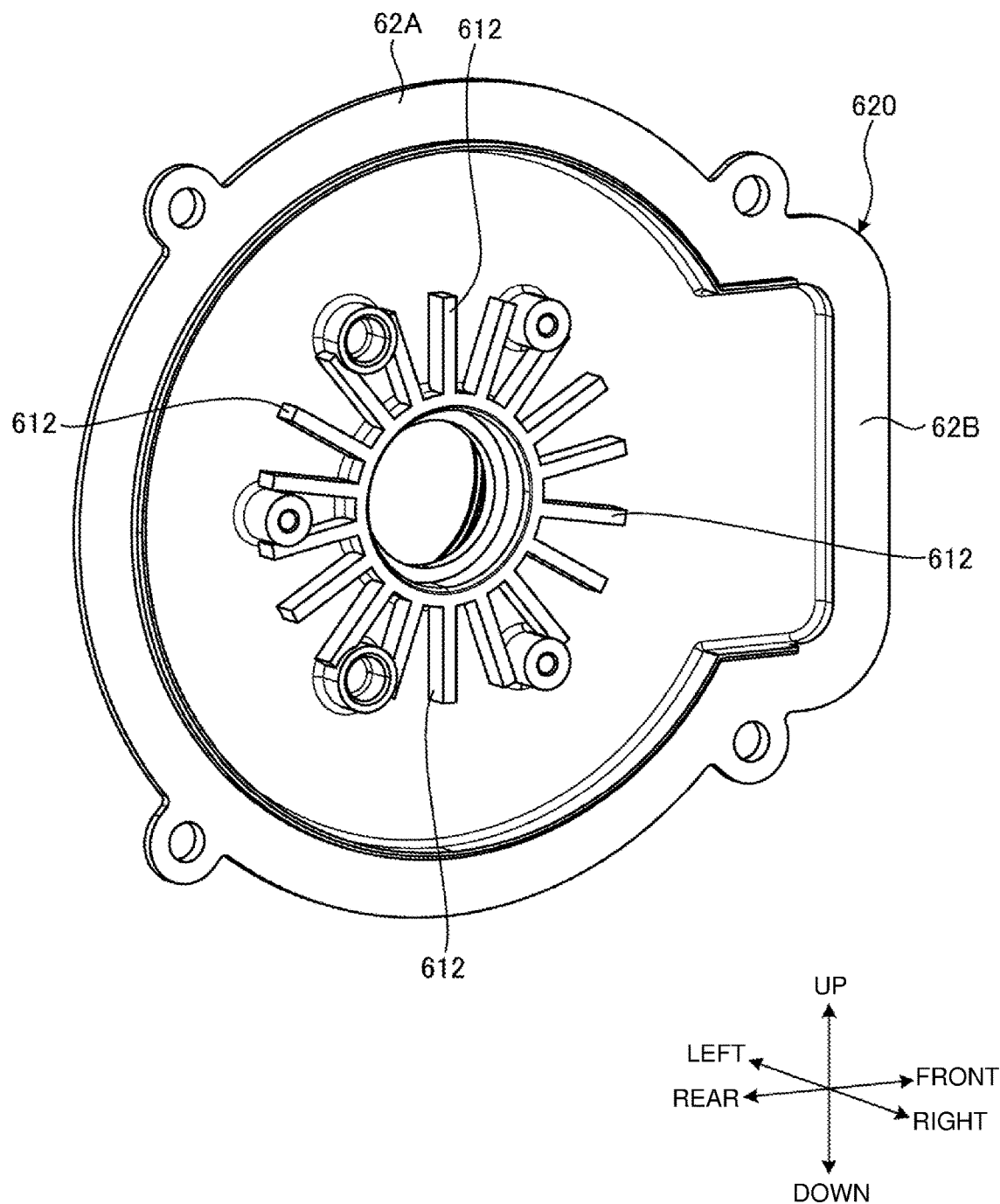
FIG. 14 is a right perspective view of the lid in the fifth embodiment.

FIG. 12 is a partially enlarged longitudinal sectional view of a motor assembly 11E in the present embodiment. FIG. 13 is a left perspective view of a lid 620 in the present embodiment. FIG. 14 is a right perspective view of the lid 620 in the present embodiment.

As shown in FIG. 12, the motor assembly 11E includes the sensor board 22 located inside the motor case 13. The sensor board 22 supports the magnetic sensors 74. As in the first embodiment, the sensor board 22 may be formed from an epoxy resin, a metal, or a heat-radiating resin with a higher thermal conductivity than an epoxy resin.

As shown in FIG. 14, the motor assembly 11E includes internal heat-radiating fins 612 located on the inner surface of the motor case 13. The motor case 13 has its inner surface facing the internal space of the motor case 13. The internal heat-radiating fins 612 in the present embodiment are located on the inner surface of the lid 620. The internal heat-radiating fins 612 protrude rightward from the inner surface (right surface) of the lid 620. The internal heat-radiating fins 612 extend in the radial direction. Multiple internal heat-radiating fins 612 are located circumferentially at intervals.

As shown in FIG. 13, the lid 620 includes external heat-radiating fins 611. The external heat-radiating fins 611 are located on the outer surface of the lid 620. The external heat-radiating fins 611 protrude leftward from the outer surface (left surface) of the lid 620. The external heat-radiating fins 611 extend in the radial direction. Multiple external heat-radiating fins 611 are located circumferentially at intervals.

As described above, the motor assembly 11E in the present embodiment includes the internal heat-radiating fins 612 on the inner surface of the motor case 13.

The motor case 13 is efficiently cooled by the internal heat-radiating fins 612.

The internal heat-radiating fins 612 in the present embodiment are located on the inner surface of the lid 620.

The internal heat-radiating fins 612 are located on the lid 620 facing the cooling fan 20. The motor case 13 is thus cooled efficiently.

The motor assembly 11E in the present embodiment includes the external heat-radiating fins 611 on the outer surface of the lid 620.

The external heat-radiating fins 611 are located on the lid 620 facing the cooling fan 20. The motor case 13 is thus cooled efficiently.

OTHER EMBODIMENTS

In each of the above embodiments, the magnetic sensors 74 are located on the sensor board 22. The magnetic sensors 74 may not be located on the sensor board 22. The magnetic sensors 74 may be located directly on a resin member or connected directly to a lead wire (signal line).

In the above embodiments, the motor 12 is a brushless inner-rotor motor. The motor 12 may be a brushless outer-rotor motor. In the brushless outer-rotor motor, the teeth protrude radially outward from the annular yoke.

The electric work machine 1 according to the above embodiments is a chain saw, which is an example of outdoor power equipment. The outdoor power equipment may not be a chain saw. Examples of the outdoor power equipment include a hedge trimmer, a lawn mower, a mowing machine, and a blower. The electric work machine 1 may be a power tool. Examples of the power tool include a driver drill, a vibration driver drill, an angle drill, an impact driver, a grinder, a hammer, a hammer drill, a circular saw, and a reciprocating saw.

In the above embodiments, the electric work machine is powered by the battery pack attached to the battery mount. In some embodiments, the electric work machine may use utility power (alternating current power supply).

REFERENCE SIGNS LIST 1 electric work machine
2 housing
2A inlet port
2B outlet port
3 front grip
4 hand guard
5 battery cover
6 controller
7 trigger lock lever
8 trigger switch
9 guide bar
10 saw chain (output unit)
11A motor assembly
11B motor assembly
11C motor assembly
11D motor assembly
11E motor assembly
12 motor
13 motor case
14 motor compartment
15 battery holder
16 rear grip
18 bearing
18L left bearing
18R right bearing
19 heat-transfer resin portion
20 cooling fan
20A inflow port
20F outflow port
21 sensor magnet
22 sensor board
23 seal
24 press assembly
25 seal
25L seal
25R seal
26 seal
27 stator
28 rotor
29 rotor shaft
30 stator core
31 insulator
32 coil
33 busbar unit
34 yoke
35 tooth
42 external terminal
44 short-circuiting member
45 insulating member
46 power line
47 connection terminal
52 screw
53 screw
54 rotor core
55 rotor magnet
56 magnet slot
57 hollow portion
58 cylindrical member
60 body
60A cylindrical portion
60B extension
60C wall
61 heat-radiating fin
62 lid
62A disk
62B extension
63 opening
64 rotary member
65 magnet slot
69 screw boss
70 screw boss
71 screw
72 shaft hole
72L shaft hole
72R shaft hole
73 fan bush
74 magnetic sensor
75 signal line
76 resin film
77 electronic component
78 screw
79 wiring path
80 insertion end opening
81 hole
91 press member
92 cover
93 ring
94 tab
95 peripheral wall
96 fastener
99 screw
101 peripheral wall
101L peripheral wall
101R peripheral wall
108L stopper
108R stopper
109 recess
113 sleeve
115 tube
220 stirring fan
220L stirring fan
220R stirring fan
611 external heat-radiating fin
612 internal heat-radiating fin
620 lid
760 heat insulating plate
760A first heat insulating plate
760B second heat insulating plate
770 heat insulator

What is claimed is:

1. An electric work machine, comprising:
a housing formed from a synthetic resin;
a motor including
a stator,
a rotor rotatable relative to the stator, and
a rotor shaft fixed to the rotor;
an output unit drivable by the rotor shaft;
a motor case having a hermetically sealed internal space accommodating the stator and the rotor, the motor case accommodated in the housing, the motor case formed from a metal;
a magnet located inside the motor case and rotatable by the rotor; and
a magnetic sensor located inside the motor case to detect the magnet.

2. The electric work machine according to claim 1, further comprising:
a sensor board supporting the magnetic sensor configured to be cooled by a cooling fan rotated by the rotor shaft.

3. The electric work machine according to claim 2, wherein
the sensor board is located between at least a part of the motor case and the magnet in an axial direction parallel to a rotation axis of the rotor.

4. The electric work machine according to claim 2, wherein
the sensor board is fixed to the motor case.

5. The electric work machine according to claim 4, wherein
the motor case includes
a body having an opening and accommodating the stator and the rotor, and
a lid fastened to the body and covering the opening, and the sensor board is fastened to the lid.

6. The electric work machine according to claim 2, wherein
the sensor board comprises a metal or a heat-radiating resin.

7. The electric work machine according to claim 1, further comprising:
a rotary member fixed to the rotor shaft inside the motor case,
wherein the magnet detectable by the magnetic sensor is a sensor magnet fixed to the rotary member.

8. The electric work machine according to claim 7, wherein
the rotary member is located between a sensor board and the rotor in an axial direction parallel to a rotation axis of the rotor.

9. The electric work machine according to claim 1, further comprising:
a heat insulating plate covering the magnetic sensor.

10. The electric work machine according to claim 1, further comprising:
a heat insulator between the magnetic sensor and the rotor in an axial direction parallel to a rotation axis of the rotor.

11. The electric work machine according to claim 10, wherein
the heat insulator is fixed to an end face of the rotor facing the magnetic sensor.

12. The electric work machine according to claim 1, further comprising:
a stirring fan located inside the motor case and rotatable by the rotor shaft.

13. The electric work machine according to claim 12, wherein
the stirring fan is fixed to the rotor shaft inside the motor case.

14. The electric work machine according to claim 1, further comprising:
a cooling fan located outside the motor case and rotatable by the rotor shaft.

15. The electric work machine according to claim 14, wherein
the cooling fan is fixed to an end of the rotor shaft located outside the motor case.

16. The electric work machine according to claim 14, wherein
the cooling fan faces at least a part of an outer surface of the motor case.

17. The electric work machine according to claim 1, further comprising:
an internal heat-radiating fin on an inner surface of the motor case.

18. The electric work machine according to claim 3, wherein
the sensor board is fixed to the motor case.

19. The electric work machine according to claim 3, wherein
the sensor board comprises a metal or a heat-radiating resin.

20. The electric work machine according to claim 4, wherein
the sensor board comprises a metal or a heat-radiating resin.

* * * * *